United States Patent [11] 3,538,853

[72] Inventor Clarence A. Dehne
 Farmington, Michigan
[21] Appl. No. 669,485
[22] Filed Sept. 21, 1967
[45] Patented Nov. 10, 1970
[73] Assignee Jervis B. Webb Company
 a corporation of Michigan

[54] CAR ACTUATED SELECTIVE SWITCH OPERATING MECHANISM FOR CONVEYORS
 8 Claims, 16 Drawing Figs.
[52] U.S. Cl. .................................................. 104/88,
 104/130, 104/140, 104/172, 104/173
[51] Int. Cl. ....................................................... B61j 3/04,
 B61k 1/00, E01b 25/15
[50] Field of Search ........................................... 104/88,
 130, 140, 172, 173

[56] References Cited
 UNITED STATES PATENTS
2,897,769  8/1959  Bishop et al. .................. 104/88

| 2,990,936 | 7/1961 | Pearson | 104/88X |
| 3,103,183 | 9/1963 | Bradt et al. | 104/88 |
| 3,194,177 | 7/1965 | Bishop | 104/88 |
| 3,261,300 | 7/1966 | Johnson | 104/88 |
| 3,316,856 | 5/1967 | Edgar et al. | 104/88 |

Primary Examiner—Arthur L. La Point
Assistant Examiner—Howard Beltran
Attorney—Farley, Forster and Farley ABSTRACT: Mechanism for changing the position of a switch in response to engagement of a switch controlling probe by a selector member positionable in coded relation on a conveyor carrier, in which the controlling probe is normally urged to a nonoperable position relative to a selector member and is moved to an operable position by probe setting means actuated by an approaching carrier. The setting means may be an actuator engaged by some portion of the carrier, or a second probe engageable by a second selector member on the carrier, for binary route coding, or by a combination of actuator and second probe.

Patented Nov. 10, 1970

INVENTOR
CLARENCE A. DEHNE
BY
Farley, Forster & Farley

ATTORNEYS

INVENTOR
CLARENCE A. DEHNE
BY Farley, Forster & Farley
ATTORNEYS

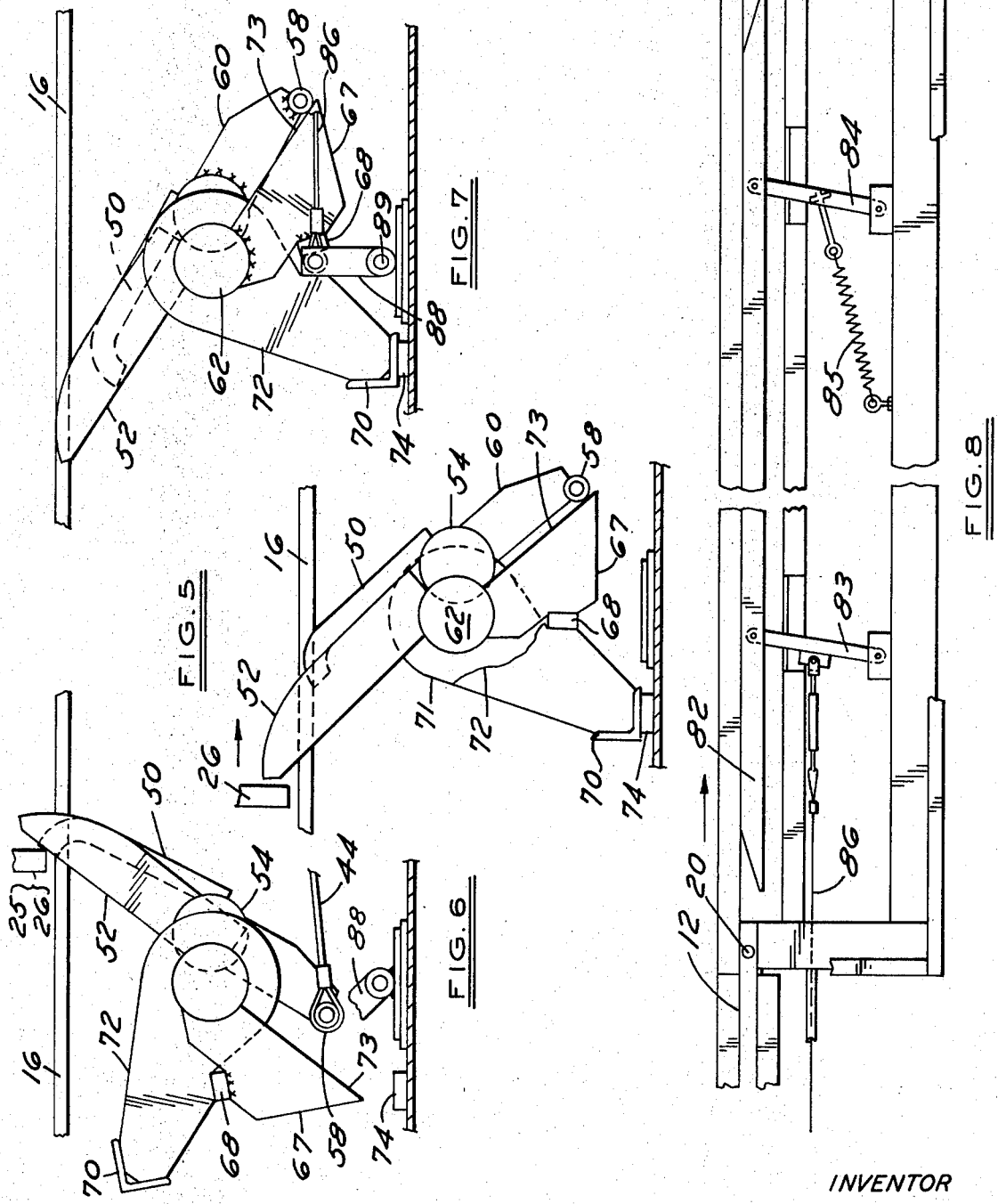

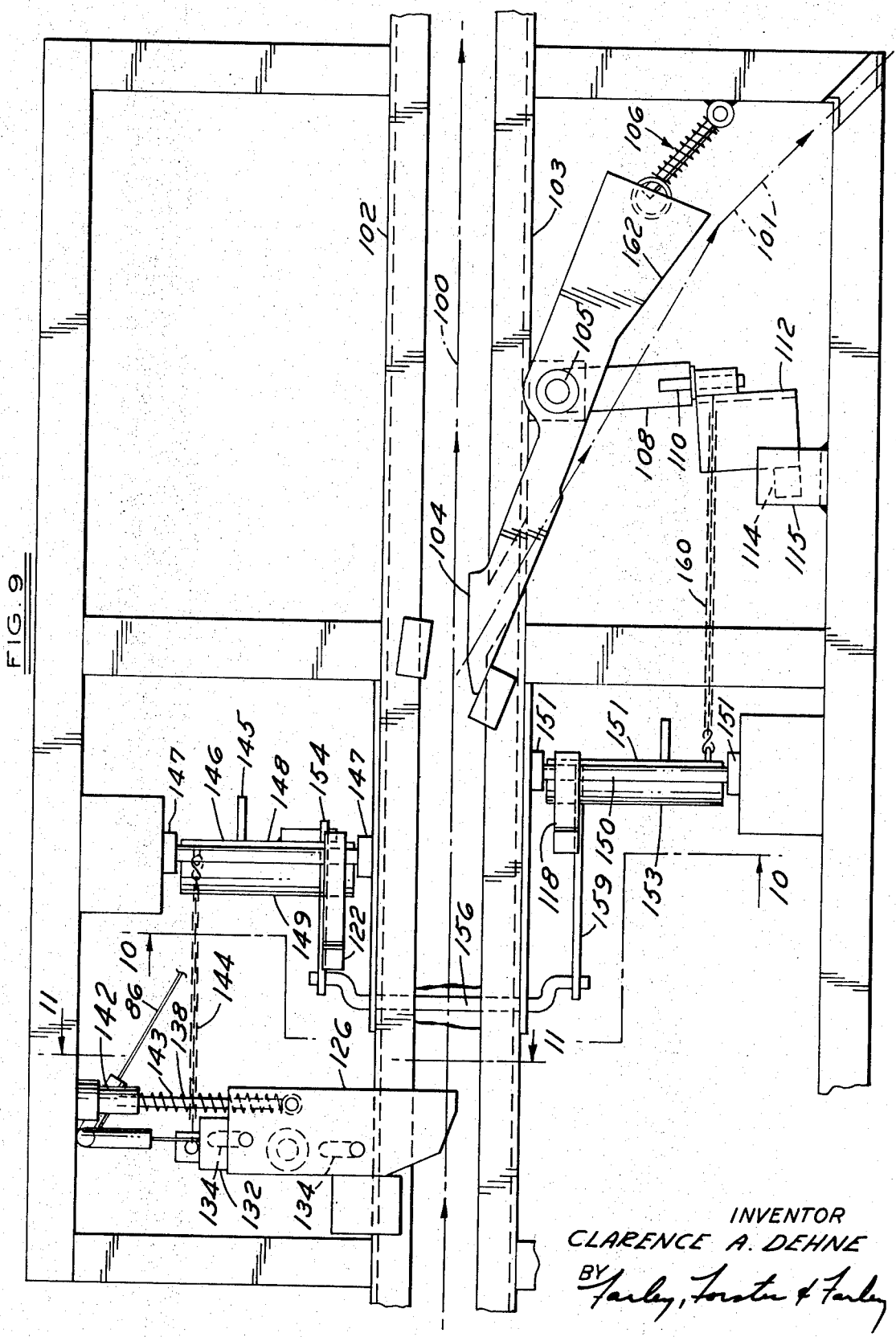

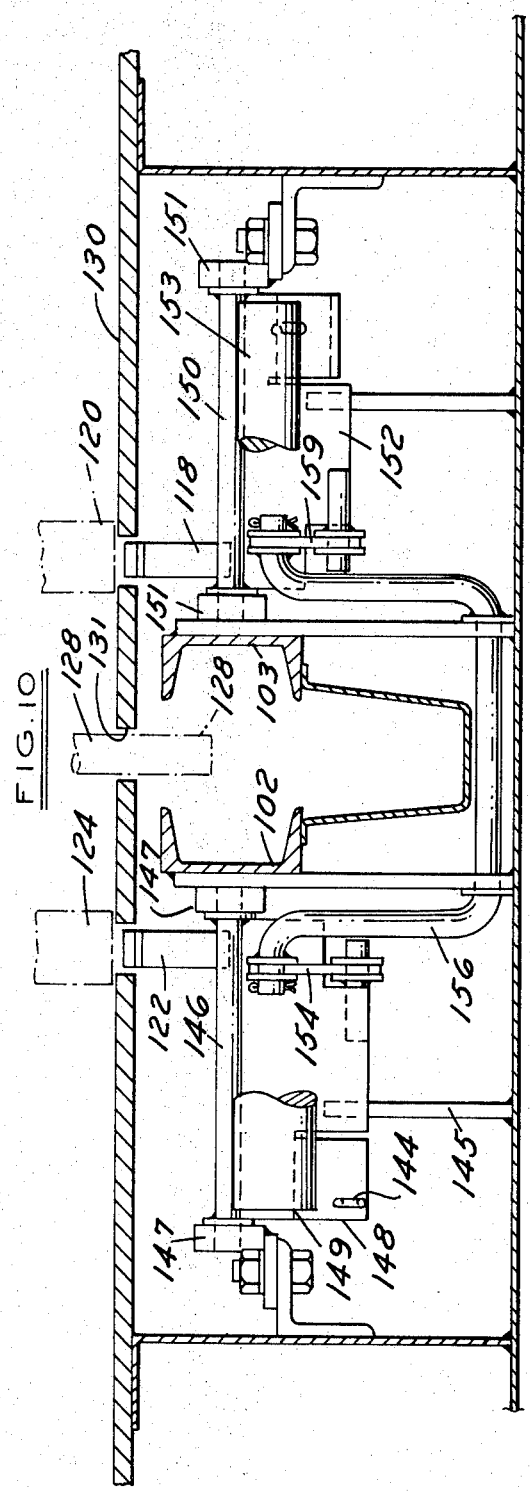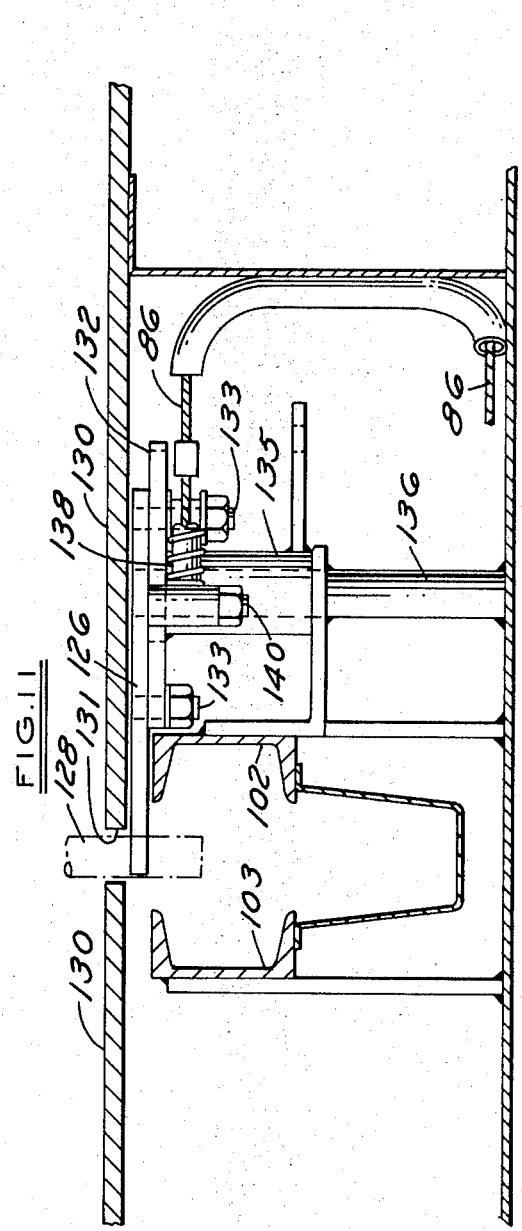

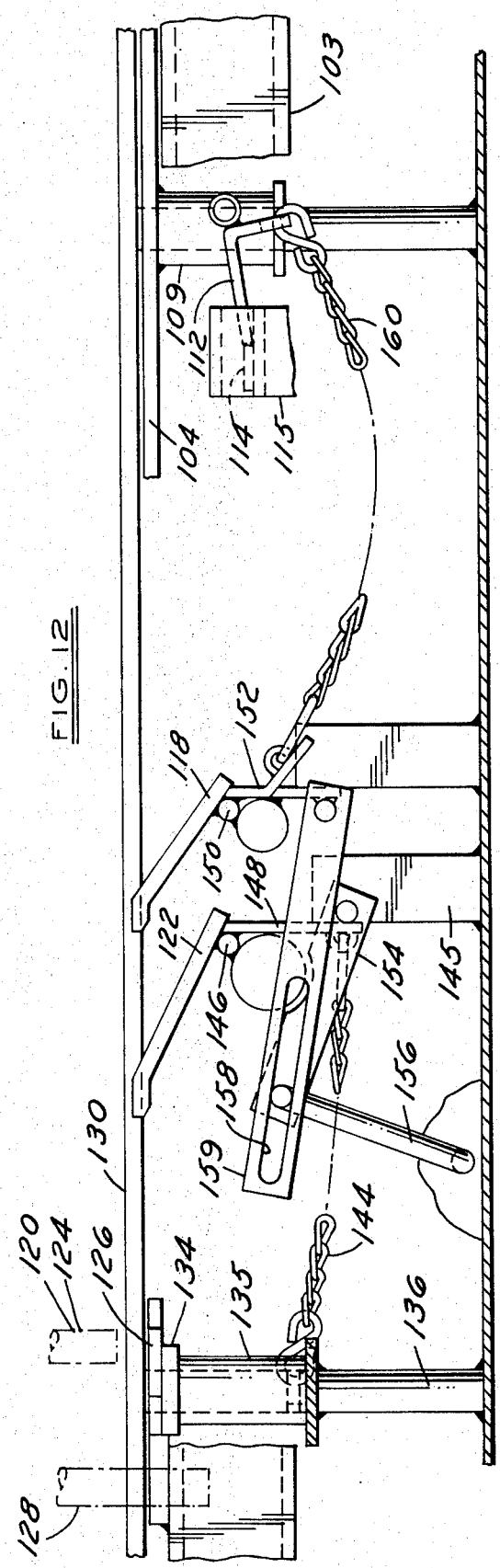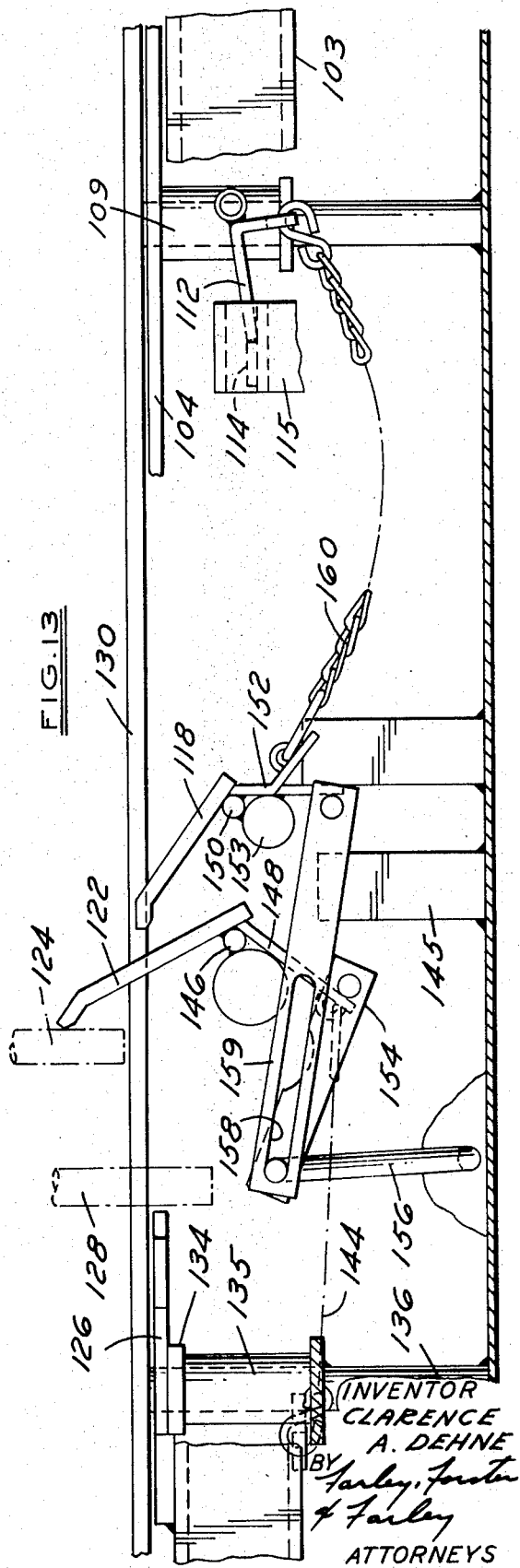

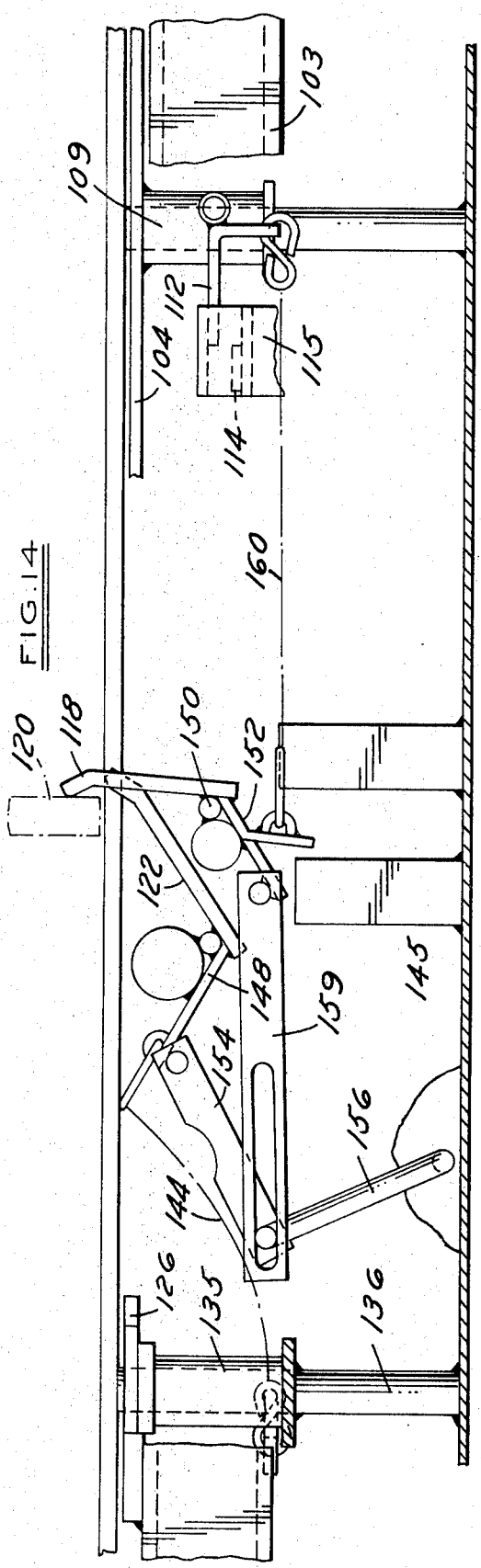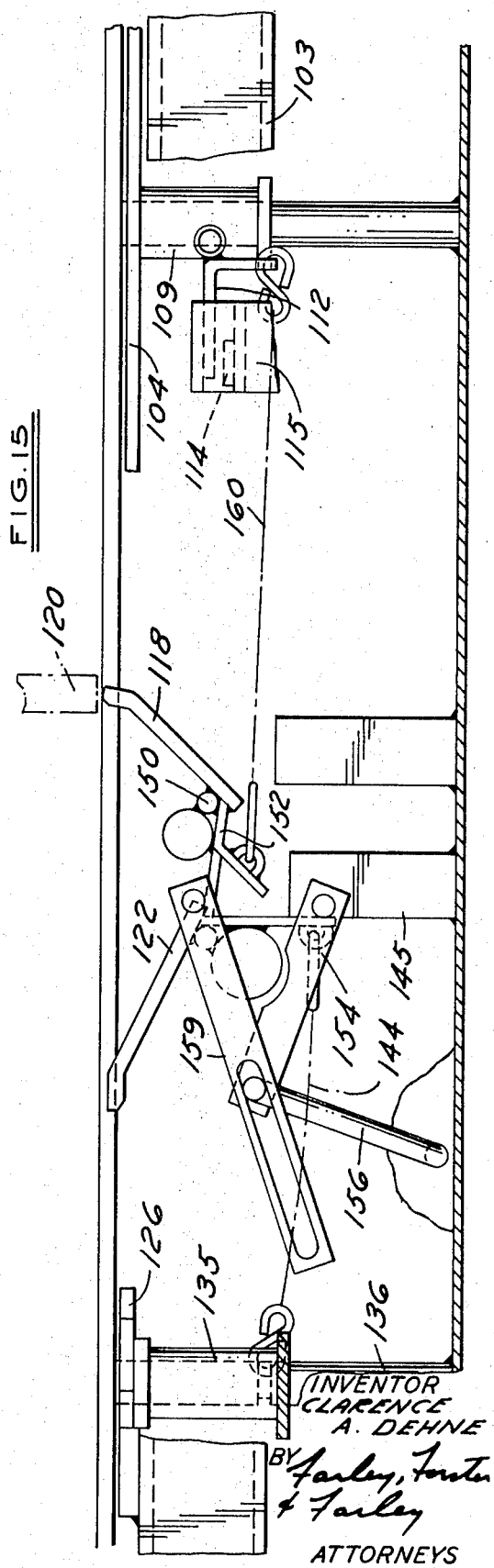

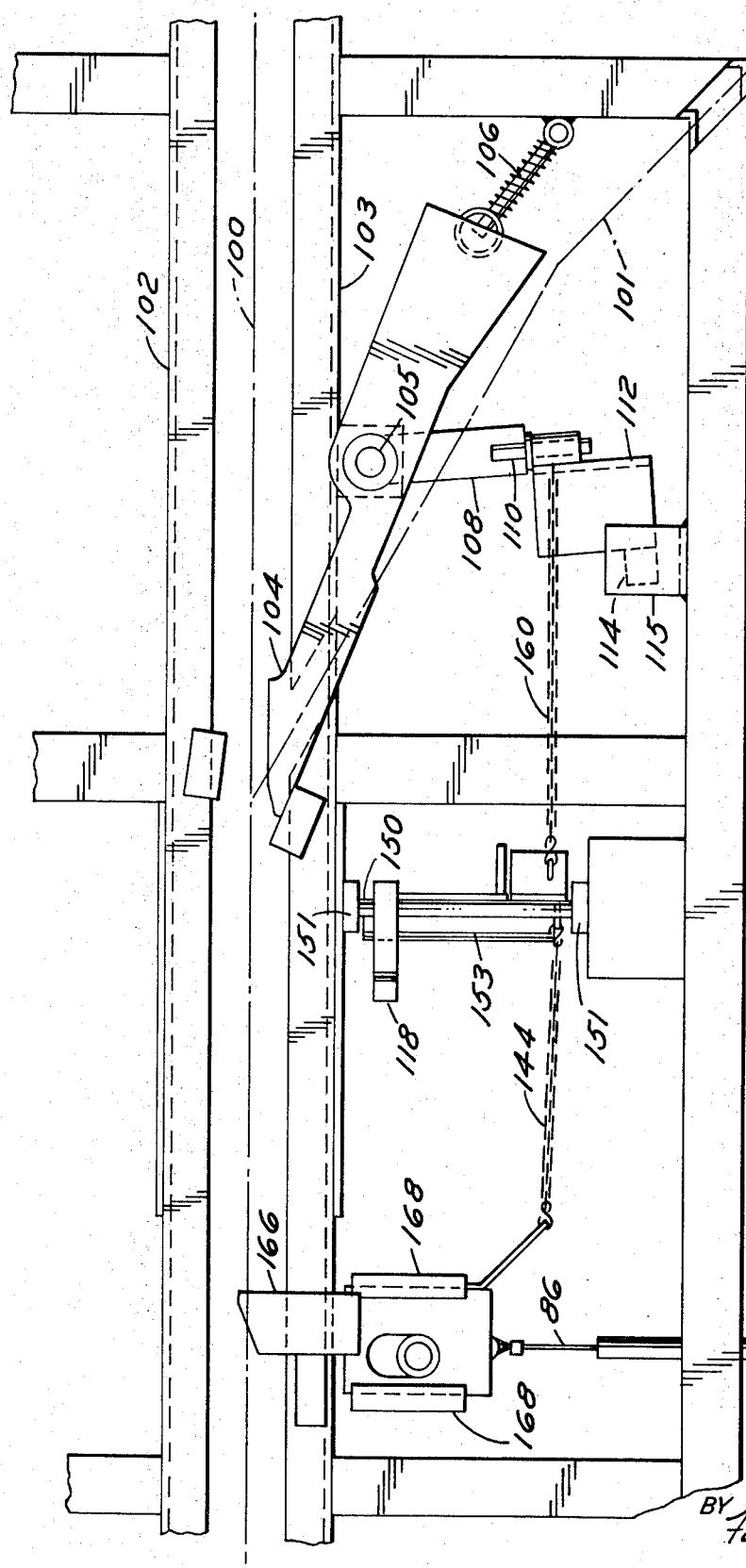

3,538,853

1

CAR ACTUATED SELECTIVE SWITCH OPERATING MECHANISM FOR CONVEYORS

BACKGROUND OF THE INVENTION

1. Field of the Invention

This invention pertains to automatic switching systems for floor truck tow line conveyors, or overhead power and free conveyors of the type in which a switch is thrown from one position to another as a function of a route code established by the relative position of at least one selector member on the conveyor carrier. At each switch junction a switch controlling probe forming part of the switch operating mechanism is located in the path of travel of the carrier selector member in one coded position thereof.

2. Description of the Prior Art

An example of a switch actuating mechanism of the by under discussion is found in U.S. Patent No. 3,103,183 in which a switch tongue is thrown from one position to another when a pair of latches acting to retain the switch tongue in one position are released by engagement of a pair of selector pins on a carrier with a pair of probes in advance of the switch. Malfunctioning of this type of construction is relatively hard to prevent in commercial practice, mainly because of difficulties in obtaining simultaneous release of both latches. Also, this type of construction is subject to the switch being thrown accidentally by causes other than a carrier. In general a problem has existed in providing a selector pin type of switch actuating mechanism, which is positive and relatively foolproof in operation, and which may be operated by two selector pins where binary route coding is desired.

SUMMARY OF THE INVENTION

In the switch operating mechanism of the present invention, one probe controls the operation of the switch and is normally biased to an inoperative position relative to a selector pin on a conveyor carrier, this probe preferably being recessed within a housing to insure against accidental operation of the switch from the probe being contacted by an object other than a carrier selector pin. Movement of the switch controlling probe from its normal inoperative position to an operable position relative to a selector pin is produced by probe setting mechanism actuatable by a carrier approaching the switch.

In single selector pin systems, the probe setting mechanism may consist of an actuator which when engaged by some portion of an approaching carrier, such as the tow pin of a floor truck, moves the switch controlling probe to operable position. Binary systems require a second selector pin and a second probe which may be used as part of the probe setting mechanisms in either of two ways. The second probe may be biased to an operable position relative to the second selector pin and, if engaged thereby, ensuing movement of the second probe is utilized to move the switch controlling probe to operable position. Alternately, the second probe may be biased to an inoperable position, moved to an operable position by an actuator contacted by an approaching carrier, and if then engaged by the second selector pin, ensuing movement of the second probe is utilized to move the switch controlling probe to operable position.

Preferably the switch is held in one normal or main line position by a latch, and selector pin produced movement of the switch controlling probe first releases the latch and then throws the switch.

All constructions offer the advantages of the positive switch operation obtained from the control of a single probe, and positive protection against accidental switch operation.

Other features and advantages of the construction will appear from the description to follow of the presently preferred representative embodiments shown in the accompanying drawings, which illustrate the application of the invention to selective switching systems for floor truck tow line conveyors.

DESCRIPTION OF THE DRAWINGS

The drawings comprise the following views:

FIG. 5 is a schematic side elevation showing the probes of FIG. 4 in normal positions;

FIG. 6 is a schematic side elevation showing the probes of FIG. 4 in switch operating position;

FIG. 7 is a schematic side elevation showing the probes of FIG. 4 in a completely inoperative position;

FIG. 8 is a plan view of a device for disabling the switch operating mechanism in response to the presence of a carrier at a selected location along one of the paths of travel following the switch junction.

FIG. 9 is a plan view of an alternate form of floor truck switch mechanism with the cover plates removed;

FIG. 10 is a transverse sectional elevation taken as indicated by the line 10-10 of FIG. 9;

FIG. 11 is a sectional elevation of the actuator mechanism, taken on the line 11-11 of FIG. 9;

FIG. 12 is a side elevation of the switch mechanism of FIG. 9 prior to actuation by a floor truck.

FIG. 13 is a side elevation similar to FIG. 12 showing engagement of a first probe of the switch mechanism by a selector pin on the floor truck;

FIG. 14 is a side elevation similar to FIG. 12 showing engagement of a second probe of the switch mechanism by a second selector pin on the floor truck;

FIG. 15 is a side elevation similar to FIG. 12 showing operation of the switch by the second probe; and FIG. 16 is a plan view of a switch mechanism similar to that of FIGS. 9—15 but for single element instead of binary coding.

DESCRIPTION OF THE PREFERRED EMBODIMENT

Figure 1:
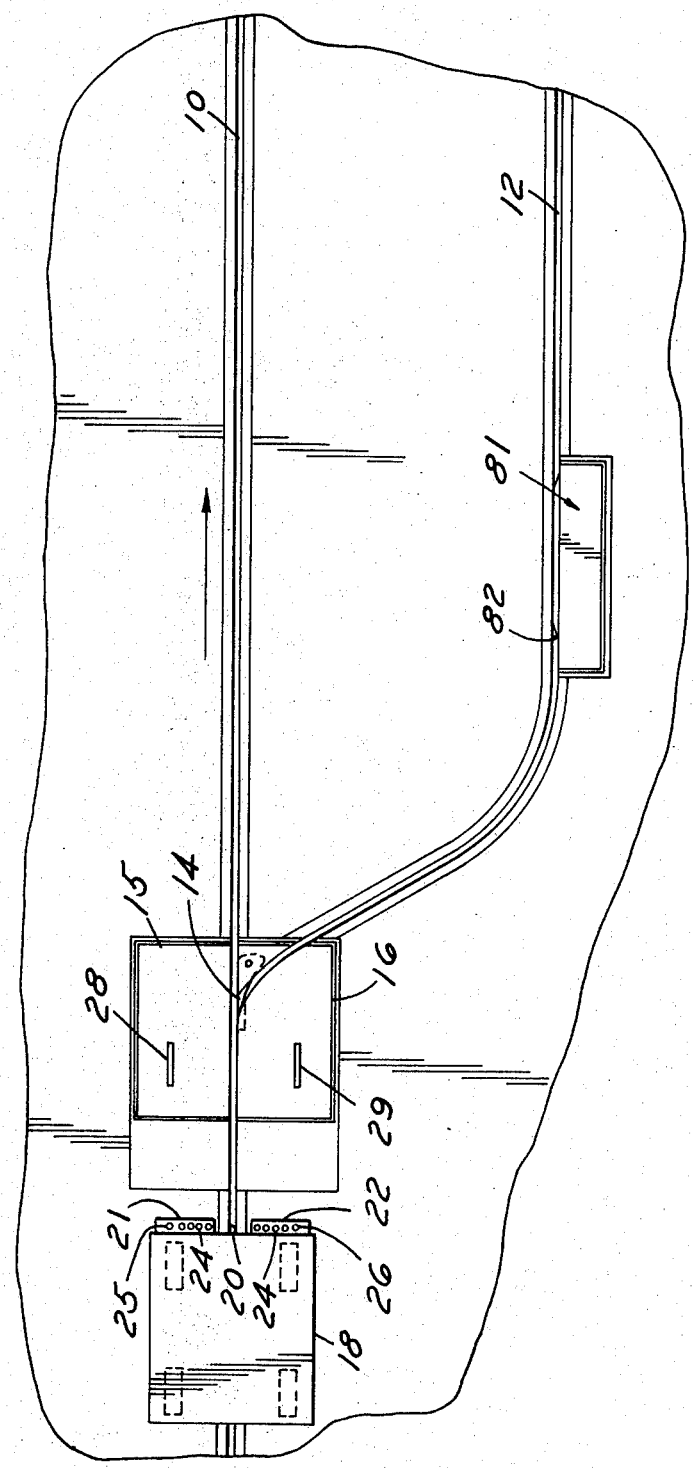
FIG. 1 is a plan view showing a floor truck carrier of a tow line conveyor approaching a junction equipped with one form of switch construction of the invention.

FIG. 1 illustrates a junction between a main guide slot 10 and a branch guide slot 12 of a floor truck tow line system. A switch or deflector 14 is mounted at the junction and is controlled by mechanism installed in a receptacle covered by floor plates 15 and 16. The complete floor truck system would include several other similar junctions between main and branch guide slots, and the switch operating mechanism enables a floor truck to be diverted from the main guide slot to a selected one of the branch guide slots.

A floor truck 18 is shown in FIG. 1 approaching the junction, being propelled by engagement of a pusher of the conventional tow line (not shown) with a tow pin 20 on the floor truck. Selector pin racks 21 and 22 mounted on the front of the floor truck 18 are each equipped with a number of apertures 24, and a selector pin 25 is mounted in one of the apertures of the rack 21 and a second selector pin 26 is mounted in one of the apertures of the rack 22. These selector pins 25 and 26 are respectively aligned with slots 28 and 29 in the floor plates 15 and 16 through which slots the probes of the switch controlling mechanism can extend. The relative position of the slots will vary at each of the other junctions to correspond with the binary code established by relative positions of the selector pins in the selector pin racks.

Figure 2:
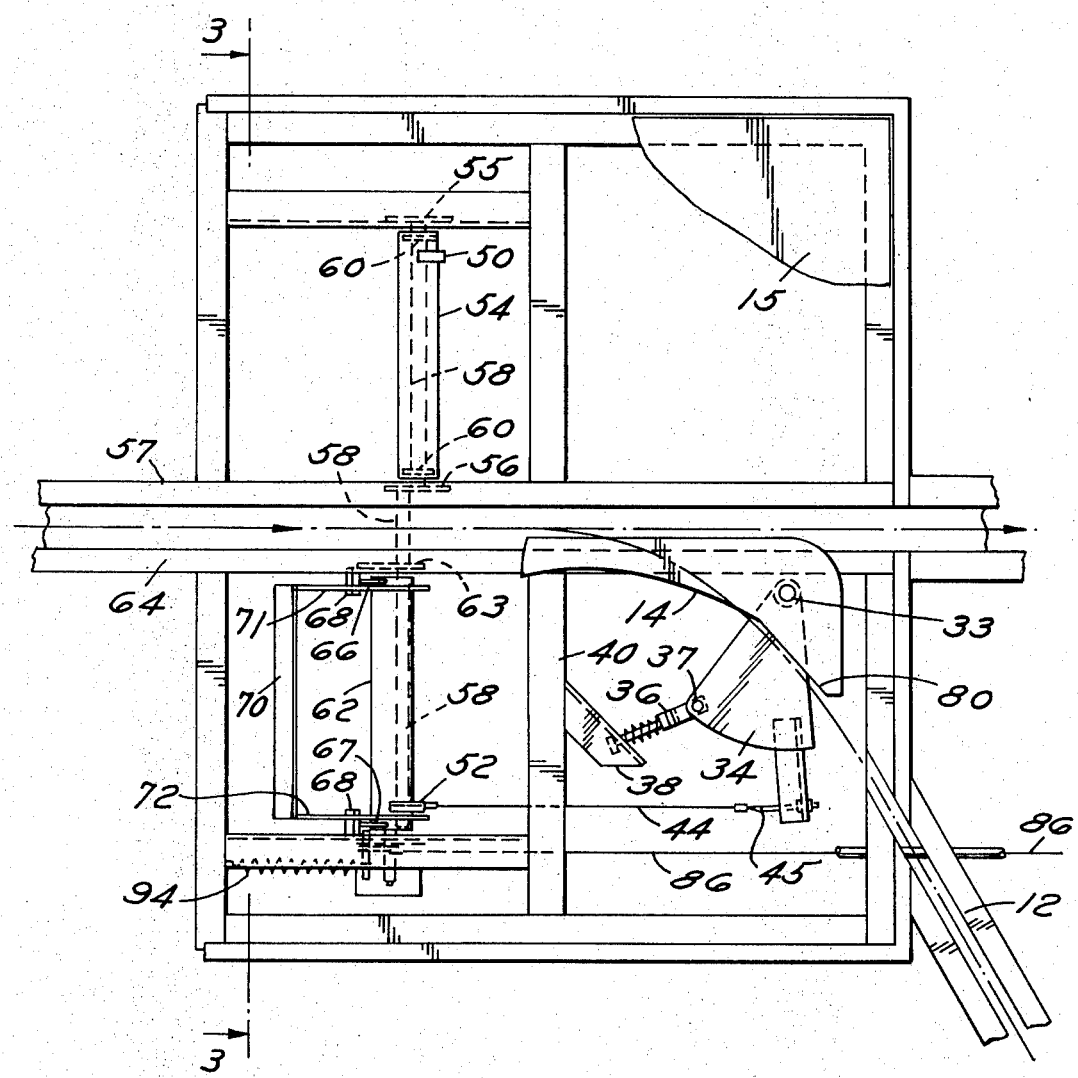
FIG. 2 is an enlarged plan view of the junction of FIG. 1 with the floor plates removed.
Figure 3:
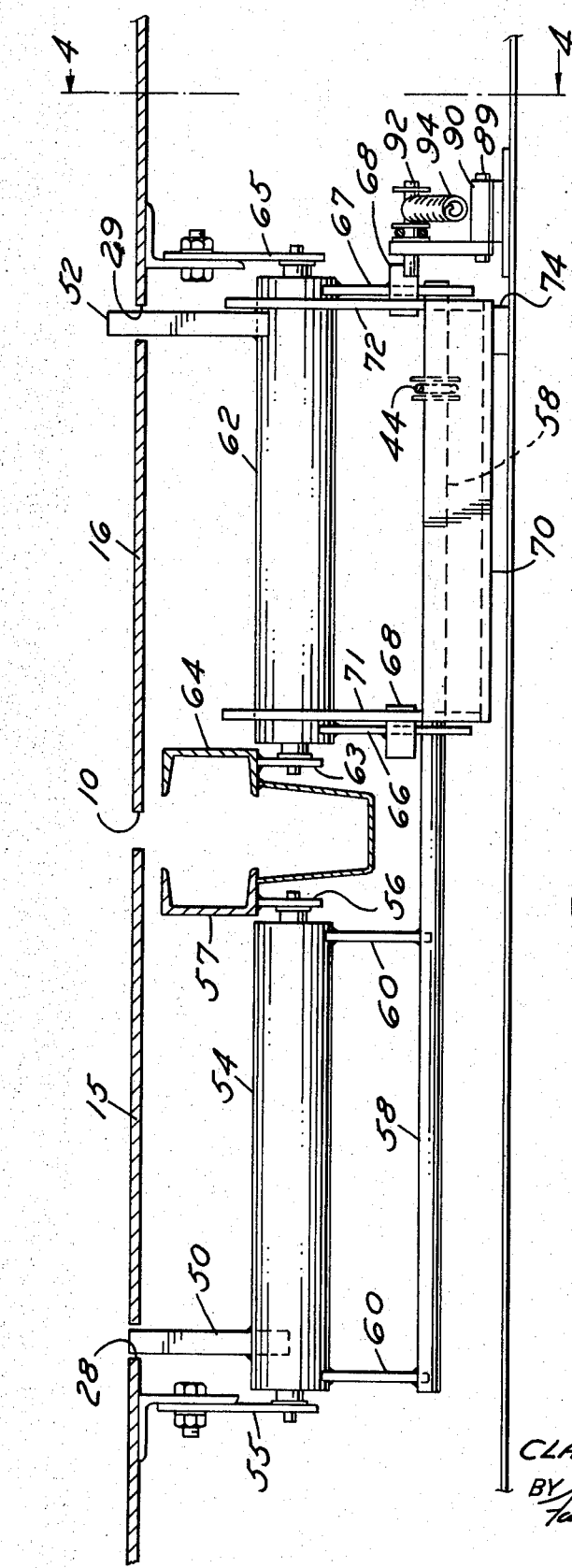
FIG. 3 is a transverse sectional elevation taken as indicated by the line 3-3 of FIG. 2.
Figure 4:
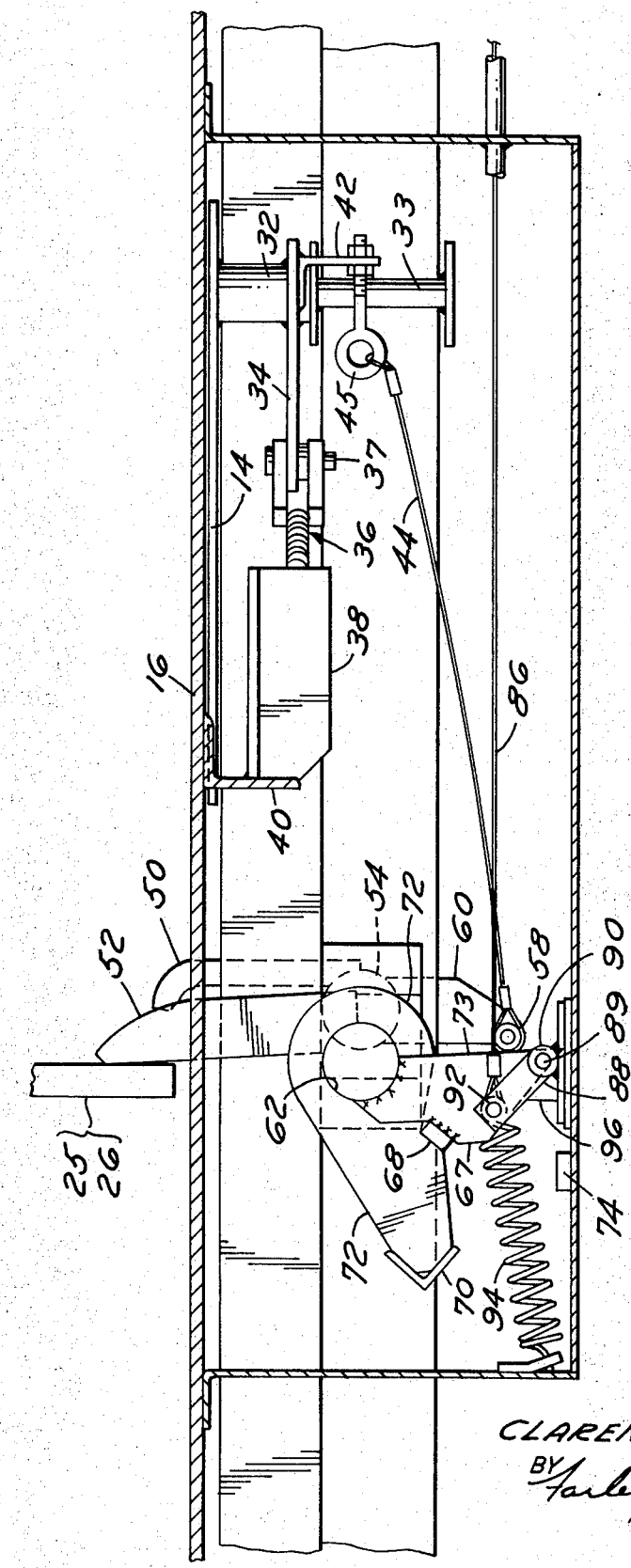
FIG. 4 is a side elevation taken on the line 4-4 of FIG. 3 showing the probes partially operated by the floor truck selector pins.

FIGS. 2—4 show the switch 14 and the mechanism for controlling its position in plan, transverse elevation and side elevational views respectively. The switch tongue 14 is mounted on a collar 32 pivoted on a fixed shaft 33. An arm 34 is secured to the collar 32 and an over-center spring device 36 is secured to the arm 34 by a pin 37 and reacts against a bracket 38 fastened to a frame cross member 40. An extension member 42 is also secured to the arm 34 and one end of a switch operating cable 44 is fastened to an eye bolt 45 attached to the member 42.

The switch actuating mechanism includes two probes 50 and 52. Probe 50, the switch controlling probe, is mounted in a selected code position on a rotatable shaft formed by a roller 54 which is supported at one side of the guide slot 10 between a bracket 55 carried by the floor plate 15 and a second bracket 56 secured to one of the track members 57 of the tow line. A bar 58, fastened to the roller 54 by a pair of depending struts 60 as best shown in FIG. 3 extends transversely beneath the tow line tracks, and the other end of the switch actuating cable 44 is secured to this bar 58.

The second probe 52 is welded to a similar roller 62 carried between a bracket 63 secured to the track member 64 and a second bracket 65 depending from the floor plate 16. A pair of positioning arms 66 and 67 are secured to and depend from the roller 62 adjacent its ends, each arm having a transversely extending abutment member 68 secured thereto. A counterweight member 70 of angle section is mounted on the ends of a pair of links 71 and 72 which rotatably engage the roller 62, and each of the links 71 and 72 overlap the abutment member 68 on one of the arms 66 and 67. As shown in FIG. 4, one face 73 of the arms 66 and 67 is engageable with the bar 58 of the roller 54, and the abutment members 68 are carried on the opposite side of the arms for engagement with the links 71 and 72 of the counterweight 70.

The biasing action of the transverse bar 58 is exceeded by the counterweight 70 which acts against the positioning arms 66 and 67 through the abutment members 68, and rotates the roller 62, the bar 58 and roller 54, to a normal position shown in FIG. 5, defined by engagement between the lower flange of the counterweight 70 and a stop block 74. In this normal position, the second probe 52 projects above floor level into the path of travel of an appropriately placed selector pin 26, and switch controlling probe 50 is in a depressed, non-engageable position below the upper surface of the floor plates.

Operation of the switch mechanism by a floor truck having its selector pins 25 and 26 set to the coded position of the probes 50 and 52 can best be appreciated by comparing FIGS. 5, 4 and 6 in that order. FIG. 5 shows the mechanism in normal position with the probe 52 about to be engaged by the selector pin 26. This engagement produces clockwise movement of the probe 52, roll 62 and the positioning arms 66 and 67, which movement is transmitted to the links 71 and 72 of the counterweight 70. The faces 73 of the arms 66 and 67 move out of engagement with the bar 58, allowing this bar to exert its counterweight effect and move the probe 50 to an operative upright position, as shown in FIG. 4, in which the probe 50 is engageable by the approaching selector pin 25. The probe 52 is made longer than the probe 50 to permit it to be first engaged and to remain in engagement with its selector pin 26 while the probe 50 is being engaged by the selector pin 25.

In FIG. 6, both probes 50 and 52 are engaged by their respective selector pins 25 and 26, and movement of the probe 50 is being transmitted to the bracket 42 on the arm 34 of the switch tongue 14 through the cable 44. Initial movement of the switch tongue from the main line position shown in FIG. 2 to branch position is augmented by the over-center spring mechanism 36, which also acts to retain the switch 14 in either position to which it is moved. When the selector pins pass on out of engagement with the probes 50 and 52, the mechanism returns to the position of FIG. 5 by the action of the counterweights 58 and 70.

Return movement of the switch 14 takes place by engagement of the floor truck tow pin 20 with a resetting cam portion 80 on the switch, which cam portion 80 projects into the path of travel of the tow pin along the branch guide slot 12 when the switch 14 is in diverting position.

When the probe mechanism is in the normal position of FIG. 5, the probe 52 is free to move counterclockwise to a depressed position if stepped upon or engaged by floor traffic.

A disabling control 81, shown in FIGS. 1 and 8, is also provided to prevent normal operation of the switch actuating mechanism if there is not room on the branch line 12 for another floor truck. This mechanism consists of a cam bar 82 supported by parallel links 83 and 84 and normally urged by a spring 85 to the position shown in which the cam bar 82 projects across the branch guide slot 12 and is engageable by the tow pin 20 of a floor truck. Such engagement results in a rocking movement of the cam bar to the right as viewed in FIG. 8, and this movement is transmitted through a cable 86 to an arm 88, best shown in FIGS. 3, 4 and 7. The arm 88 is attached to a shaft 89 pivoted in a bearing 90. The cable 86 is secured to a cross member 92 on the arm 88 together with a return spring 94 which normally urges the arm 88 to the position shown in FIG. 4 and defined by a triangular stop member 96.

If the cam bar 82 is moved by a tow pin 20 as described above, the arm 88 moves clockwise to the position shown in FIG. 7 and this movement is transmitted to the positioning arm 67 of the roller 62 through the abutment member 68 which is overlapped by the cross member 92 of the arm 88. The probe 52 is moved to the depressed, inoperative position shown in FIG. 7 and the probe 50 is further depressed; moreover, the probes are held in this position by the cable 86 and arm 88 as long as the cam bar 82 remains in engagement with a floor truck tow pin 20. A floor truck diverted to the branch guide slot 12 must be advanced beyond the location of the cam bar 82 in order for the switch actuating mechanism to be operable for diverting another truck.

Except for the operation of the lockout device, the second probe 52 which is arranged for engagement by a selector pin in advance of or prior to the switch controlling probe 50, is normally urged by the counterweight 70 to an operative position, and the positioning arms 66 and 67 associated with the probe 52 and roll 62 act through the transverse counterweight bar 58 of the probe 50 to normally position the probe 50 in nonengageable relation with a selector pin. The probe 52, when first engaged by a selector pin 26, has a cocking or setting action causing the switch controlling probe 50, to move to an operable position in which it is engageable by a selector pin. Thereafter, the movements of the probes 50 and 52 by the selector pins are independent of each other, with the means for changing the setting of the switch acting only in response to movement of the switch controlling probe 50.

The mechanism is relatively simple and operates on gravity biased action. Rollers 54 and 62 are used for supporting the probes 50 and 52 to provide a standardized construction in which each roller affords a number of probe mounting positions along its length for different code settings at a number of switches.

A modified form of binary coded switch operating mechanism for a floor truck tow line conveyor installation is shown in FIGS. 9—15. This mechanism incorporates additional features for preventing inadvertent and improper operation of the switch.

Referring to FIG. 9, in which the floor plates have been removed to expose the mechanism in plan view, the main path of floor truck travel is indicated by the broken line 100, the branch path of travel by the broken line 101, and the members 102 and 103 are the tracks for the tow line trolleys (not shown). A switch tongue 104, mounted on a pivot 105 and acted upon by the over-center spring mechanism 106, is shown in the main line position. An arm 108, secured to the switch supporting collar 109 (FIG. 12) carries a pivot pin 110 on which a latch member 112 is mounted, and locks the switch in main line position by engagement with an abutment or latch plate 114 carried by a bracket 115.

Release of the latch 112 and movement of the switch tongue 104 to branch line position takes place in response to engagement of a switch controlling probe 118 by a selector member 120 (FIG. 10) mounted on the conveyor carrier or floor truck in the manner previously described. The switch controlling probe 118 is normally urged to a nonoperable position relative to the selector member 120 and is set in operative position by the combined action of a second probe 122 engageable by a second selector member 124 and an actuator member 126 engagable by the floor truck tow pin 128.

Referring to FIGS. 9 and 11, the actuator member 126 is mounted just below the floor plates 130 and projects into the path of movement of the floor truck tow pin 128 traveling in the guide slot 131 defined by the plates 130. The member 126 is supported on a subplate 132 by studs 133 engaging a pair of slots 134 in the subplate which is secured to a collar 135 pivoted on a shaft 136. A guide rod 138 is connected by a pivot 140 depending from the actuator member 126; the other end of the guide rod slidably engages a fixed sleeve 142, and a spring 143 acts against the sleeve 142 to normally urge the actuator member 126 to the position shown in FIGS. 9 and 11 in which it is engagable by the tow pin 128 of an approaching carrier. Such engagement will cause pivotal movement of the actuator member 126 in a counterclockwise direction as viewed in FIG. 9, which movement is transmitted through a connection 144 to the second probe 122.

The cable 86 of a lockout device 81 previously described is fastened to the stud 133 which is connected to the actuator member and which engages one of the slots 134; hence, movement of the cam bar 82 of the disabling control is transmitted through the cable 86 and causes sliding movement of the actuator member on the plate 132 to a retracted or disabled position relative to the tow pin 128 of a carrier traveling along the guide slot 131.

The structure for supporting the probes 118 and 122 is best shown in FIGS. 9, 10 and 12. Probe 122 is secured to a shaft 146, supported in bearings 147, together with a depending plate 148 and cylindrical bar 149 which serves as a counterweight or biasing means normally urging the second probe 122 to a nonoperative position relative to the second selector member 124, as shown in FIGS. 10 and 12, and defined by abutment between the plate 148 and a stop 145. Probe 118 is mounted in a similar manner, being secured to a shaft 150, supported in bearings 151, together with a depending plate 152 and cylindrical bar 153 which bias the switch controlling probe 118 to a nonoperable position as shown in FIGS. 10 and 12.

A link 154 pivoted on the depending plate 148 of the second probe structure, is connected to a U-shaped cross shaft 156 which extends transversely beneath the tow line structure. The other end of the cross shaft 156 engages an elongated slot 158 in a link 159 which is pivoted to the depending plate 152 of the switch controlling probe 118. A chain 160 is connected between the depending plate 152 of the switch controlling probe 118 and the latch member 112 associated with the switch tongue.

Operation of this switch controlling mechanism is progressively shown in FIGS. 12 to 15 inclusive. FIG. 12 shows the parts in a normal position with the tow pin 128 of a floor truck carrier, driven by a pusher of the tow line (not shown) in the conventional manner, approaching the actuator member 126 at the left side of the view. The switch tongue 104 is in the main line position as shown in FIG. 9. The tow pin of the conveyor carrier is preceded by the transversely aligned selector members 120 and 124 which have been positioned at the same spacing to either side of the tow pin as the probes 118 and 122 are spaced to either side of the center of the guide slot 131.

In FIG. 13, the tow pin 128 has engaged the actuator member 126, causing it to pivot counterclockwise as viewed in FIG. 9, thereby raising the second probe 122 from the nonoperative position to an operable position and moving the cross shaft 156 toward the end of the slot 158 in the link 159. The second selector member 124 has just engaged the probe 122, and ensuing pivotal movement of the probe 122 is transmitted through the link 154, cross shaft 156 and link 159 to raise the switch controlling probe 118 to an operable position in which it is subsequently engaged by the selector member 120 as shown in FIG. 14. Resulting movement of the switch controlling probe 118 is transmitted to the latch 112 through the chain 160, and initial movement of the probe 118 pivots the latch to released position as shown in FIG. 14. Further movement of the probe 118 is imparted to the switch tongue, and this movement together with the action of the over-center spring device 106 changes the tongue to branch line position.

The actuator member 126 is returned to normal position by the spring 143, and the probes 122 and 118 are successively and independently returned to their normal, nonoperative positions as their respective selector members pass on out of engagement.

The tow pin 128 of a diverted carrier resets the switch tongue to mainline position by engagement with the resetting cam portion 162 thereof (FIG. 9).

FIG. 16 illustrates an application of the invention to a single element rather than binary code system. The switch tongue 104 and parts associated therewith are similar to those described in connection with the embodiment of FIGS. 9—15 and the same reference numerals have been used. This same comment applies to the switch controlling probe 118, and further description of these parts is therefore not necessary.

A similar probe setting means actuatable by the tow pin of an approaching carrier is employed for moving the switch controlling probe 118 from its normal nonoperable position to an operable position with respect to the single selector member (not shown) on the carrier. This probe setting means consists of an actuator member 166 mounted for sliding movement in guides 168 carried by a subplate member which is mounted for pivotal movement in a manner similar to the member 132 described in connection with the actuator member 126. Sliding movement of the actuator member 166 is imparted by the cable 86 of a disabling control 81; and, pivotal movement of the actuator 166 takes place in response to engagement by a carrier tow pin, as previously described. Pivotal movement of the actuator raises the switch controlling probe 118 to an operable position, and engagement of the probe 118 by a selector member results in the position of the switch tongue being changed.

I claim:

1. In switch operating mechanism of the type in which the position of the switch is changed as a function of a route code established by the positioning of at least one selector member on a floor truck carrier equipped with a tow pin engaging a guide slot formed in the carrier supporting surface of a tow line conveyor, said mechanism including a switch controlling probe movably supported in advance of the switch in the line of travel of the selector member in one position thereof and biased to a nonoperable position relative to the selector member; the improvement comprising probe setting means actuatable by a carrier approaching the switch for moving the switch controlling probe to an operable position in which it is engageable by the selector member, and disabling mechanism for moving the probe setting means to a nonactuatable position relative to the carrier in response to the presence of another carrier at a location along a path of carrier travel following the switch.

2. Switch operating mechanism as claimed in claim 1 wherein the probe setting means comprises an actuator member movably mounted below the supporting surface and projecting into the guide slot for engagement by the floor truck tow pin, the disabling mechanism being capable of retracting the actuator member out of the path of tow pin travel.

3. Switch operating mechanism as claimed in claim 2 including a second probe movable into the path of travel of a second selector member on the carrier in response to engagement of the actuator member by a carrier tow pin, and wherein the switch operating probe is mounted on one side of the guide slot and the second probe is mounted on the other side thereof, and a connection between the second probe and the switch operating probe extending beneath the tow line conveyor.

4. Switch operating mechanism as claimed in claim 2 wherein the actuator member is mounted by means permitting pivotal movement thereof in response to engagement by a portion of a conveyor carrier and linear movement thereof by the disabling mechanism.

5. Switch operating mechanism as claimed in claim 1 where the probe setting means comprises a second probe movably mounted for engagement by a second selector member mounted on the conveyor carrier in a binary code relation to the one selector member, biasing means urging the second probe to an operative position in which it may be engaged by the second selector member, and means for moving the switch controlling probe to the operable position in response to engagement of the second probe by the second selector member.

6. Switch operating mechanism as claimed in claim 5 wherein the biasing means urging the second probe to an operative position comprises a first counterweight supported for rocking movement relative to the second probe, the means for moving the switch controlling probe to the operable position comprises a second counterweight supported in fixed relation to the switch controlling probe, the biasing effect of the first counterweight exceeding that of the second counterweight and means transmitting movement of the first counterweight in one direction to the switch controlling probe.

7. Switch operating mechanism as claimed in claim 5 wherein the selector members and probes are arranged so that the second probe is engageable by the second selector member prior to any engagement of the switch controlling probe by the one selector member.

8. Switch operating mechanism as claimed in claim 5 wherein the disabling mechanism is capable of moving the second probe to an inoperative position relative the second selector member.